US012744273B2

(12) United States Patent
Kim

(10) Patent No.: US 12,744,273 B2
(45) Date of Patent: Sep. 22, 2026

(54) BATTERY MODULE HAVING PRESSURE SENSOR FOR DETECTING THERMAL PROPAGATION

(71) Applicant: LG ENERGY SOLUTION, LTD., Seoul (KR)

(72) Inventor: Do-Yul Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 637 days.

(21) Appl. No.: 18/038,600

(22) PCT Filed: Sep. 26, 2022

(86) PCT No.: PCT/KR2022/014381
§ 371 (c)(1),
(2) Date: May 24, 2023

(87) PCT Pub. No.: WO2023/068580
PCT Pub. Date: Apr. 27, 2023

(65) Prior Publication Data

US 2024/0014494 A1 Jan. 11, 2024

(30) Foreign Application Priority Data

Oct. 19, 2021 (KR) ........................ 10-2021-0139765

(51) Int. Cl.
*H01M 50/242* (2021.01)
*G01L 1/26* (2006.01)
(Continued)

(52) U.S. Cl.
CPC ............. *H01M 50/242* (2021.01); *G01L 1/26* (2013.01); *H01M 10/482* (2013.01); *H01M 50/211* (2021.01); *H01M 2220/20* (2013.01)

(58) Field of Classification Search
CPC ............. H01M 50/242; H01M 50/482; H01M 50/249; H01M 50/211; H01M 2220/20; G01L 1/26
See application file for complete search history.

(56) References Cited

U.S. PATENT DOCUMENTS

2009/0053586 A1* 2/2009 Fredriksson ........ H01M 50/325 429/57
2009/0123814 A1* 5/2009 Cabot ................. H01M 10/052 429/61
(Continued)

FOREIGN PATENT DOCUMENTS

CN 101281073 A * 10/2008
CN 109449519 A 3/2019
(Continued)

OTHER PUBLICATIONS

CN-101281073 MT (Year: 2008).*
(Continued)

*Primary Examiner* — Alexander Usyatinsky
(74) *Attorney, Agent, or Firm* — Birch, Stewart, Kolasch & Birch, LLP

(57) ABSTRACT

A battery module includes a cell stack having a plurality of battery cells stacked in one direction; a pressure sensor unit disposed between one battery cell and another battery cell facing the battery cell, and having a plurality of pressure sensing nodes protruding toward the other battery cell; and a surface pressure transmission plate disposed between the pressure sensor unit and the other battery cell, and having a flat surface facing the plurality of pressure sensing nodes.

11 Claims, 7 Drawing Sheets

(51) Int. Cl.
*H01M 10/48* (2006.01)
*H01M 50/211* (2021.01)

(56) References Cited

U.S. PATENT DOCUMENTS

| | | | | |
|---|---|---|---|---|
| 2016/0181674 | A1 | 6/2016 | Kristofek et al. | |
| 2017/0110696 | A1* | 4/2017 | Schoenherr ....... | H01M 10/0525 |
| 2017/0324122 | A1 | 11/2017 | Poirier et al. | |
| 2019/0097189 | A1* | 3/2019 | Howe ................. | H01M 50/264 |
| 2020/0136109 | A1* | 4/2020 | Idikurt ............. | H01M 10/0525 |
| 2020/0168959 | A1 | 5/2020 | Hettrich | |
| 2020/0350535 | A1 | 11/2020 | Moriura et al. | |
| 2020/0358145 | A1 | 11/2020 | Sauerteig et al. | |

FOREIGN PATENT DOCUMENTS

| | | | |
|---|---|---|---|
| CN | 210142677 | U | 3/2020 |
| CN | 210607516 | U | 5/2020 |
| CN | 212209689 | U | 12/2020 |
| CN | 112229548 | A | 1/2021 |
| JP | 2006-269345 | A | 10/2006 |
| JP | 2013-20826 | A | 1/2013 |
| JP | 2014-154399 | A | 8/2014 |
| JP | 5790219 | B2 | 10/2015 |
| JP | 6016026 | B2 | 10/2016 |
| JP | 2017-27774 | A | 2/2017 |
| JP | 2020-24809 | A | 2/2020 |
| JP | 2020-205247 | A | 12/2020 |
| KR | 10-2017-0112495 | A | 10/2017 |
| KR | 10-2021-0003360 | A | 1/2021 |
| KR | 10-2021-0069963 | A | 6/2021 |
| KR | 10-2021-0069967 | A | 6/2021 |
| KR | 10-2021-0073898 | A | 6/2021 |
| KR | 10-2021-0110921 | A | 9/2021 |
| WO | WO 2015/144324 | A1 | 10/2015 |
| WO | WO 2019/146546 | A1 | 8/2019 |
| WO | WO 2022/050583 | A1 | 3/2022 |

OTHER PUBLICATIONS

JPO Notice of Reasons for Refusal (Jun. 25, 2024) (Year: 2024).*

JPO decision to grant a Patent for JP 2023534407 (Year: 2024).*

The decision of JPO to grant a Patent for Application to Grant a Patent for JP2023534407 (Year: 2024).*

International Search Report (PCT/ISA/210) issued in PCT/KR2022/014381 mailed on Jan. 5, 2023.

Extended European Search Report for European Application No. 22883804.1, dated Jan. 31, 2025.

* cited by examiner

Prior Art

BATTERY MODULE HAVING PRESSURE SENSOR FOR DETECTING THERMAL PROPAGATION

TECHNICAL FIELD

The present disclosure relates to a battery module, and more specifically, to a battery module for detecting any abnormality of a battery cell by measuring the swelling pressure of the battery cell.

The present application claims priority to Korean Patent Application No. 10-2021-0139765 filed on Oct. 19, 2021 in the Republic of Korea, the disclosures of which are incorporated herein by reference.

BACKGROUND ART

Secondary batteries have high applicability according to product groups and electrical characteristics such as high energy density. Such secondary batteries are commonly applied not only to portable electronic devices, but also to electric vehicles, hybrid electric vehicles, energy storage systems, or the like, which are driven by electric power sources.

Secondary batteries widely used at present include lithium-ion batteries, lithium polymer batteries, nickel cadmium batteries, nickel hydrogen batteries, nickel zinc batteries, and the like. An operating voltage of one secondary battery cell is about 2.5 V to 4.2 V. Therefore, when a higher output voltage is required, a battery module may be configured by connecting a plurality of secondary battery cells in series or by connecting a plurality of secondary battery cells in series and in parallel according to the charge/discharge capacity.

Meanwhile, in the case of a secondary battery cell of a battery module, a phenomenon in which the secondary battery cell swells due to gas generated by electrode expansion and/or internal electrolyte decomposition during repeated charge/discharge may occur. This phenomenon in which the secondary battery cell swells is called 'swelling phenomenon'.

Repeated swelling of the secondary battery cell due to expansion and contraction of the electrode during charge/discharge is common and is not a big problem because the degree thereof is weak. However, in a swelling phenomenon where the temperature rises sharply due to a problem in the secondary battery cell and at this time, a large amount of gas is generated therein, thereby causing an increase in the internal pressure of the secondary battery cell, resulting in swelling, a very large pressure is applied, and thus it may lead to ignition or explosion of the secondary battery cell. Therefore, during operation of the battery module, it is necessary to monitor the swelling pressure of the secondary battery cell and stop the operation of the battery module when the swelling pressure exceeds a certain level.

Accordingly, in the conventional battery module, as disclosed in Japanese Patent Laid-Open Publication No. JP 2020-205247, the surface pressure of a battery cell is measured using a pressure sensor.

FIG. 1 is a view showing a pressure sensor of a battery module according to the prior art. As shown in FIG. 1, a pressure sensor 2 is inserted between two secondary battery cells 1A, 1B facing each other to sense the pressure when the secondary battery cell expands.

However, since the pressure sensor 2 as shown in FIG. 1 does not cover the entire surface of the secondary battery cell, it is not capable of detecting whether there is an abnormality in the overall surface pressure of the secondary battery cell or not. That is, the pressure sensor 2 may sense the pressure only in a local area in the battery cell. Therefore, it is difficult for the pressure sensor 2 to accurately detect an abnormal situation such as thermal propagation or the like of the secondary battery cell by measuring the overall surface pressure of the secondary battery cell.

In addition, in the case of a conventional battery module, there are problems in that marks are formed on the surface of the secondary battery cell in the shape of a pressure sensor and pressure is concentrated due to a reaction of force when the secondary battery cell expands. Accordingly, as the swelling of the secondary battery cells is repeated during operation of the battery module, the pressure sensor continuously presses the surface of the secondary battery cell, thereby causing damage to the surface of the secondary battery cell, which adversely affects the behavior of the secondary battery cell.

DISCLOSURE

Technical Problem

The present disclosure is designed to solve the problems of the related art, and therefore the present disclosure is directed to providing a battery module capable of detecting any abnormality in a battery cell by sensing the overall surface pressure of the battery cell during swelling without causing damage to the surface of the battery cell by the pressure sensor.

However, technical problems to be solved by the present disclosure are not limited to the above-described problems, and other problems not mentioned herein may be clearly understood by those skilled in the art from the following description of the present disclosure.

Technical Solution

A battery module according to the present disclosure for achieving the above technical problem may include a cell stack having a plurality of battery cells stacked in a first direction; a pressure sensor disposed between a first battery cell of the plurality of battery cells and a second battery cell of the plurality of battery cells facing the first battery cell, and having a plurality of pressure sensing nodes protruding toward the second battery cell; and a surface pressure transmission plate disposed between the pressure sensor and the second battery cell, and having a flat surface facing the plurality of pressure sensing nodes.

The surface pressure transmission plate may be configured to have a size corresponding to an area of a surface of the first battery cell.

The surface pressure transmission plate may be made of a plastic material.

The battery module may include a sensitivity adjusting plate formed of a compressible material and disposed between the plurality of pressure sensing nodes and the surface pressure transmission plate.

The sensitivity adjusting plate may be a foam pad.

The sensitivity adjusting plate may be configured not to be compressed at less than a predetermined pressure.

The plurality of battery cells may be pouch-type battery-cell cells.

The plurality of pressure sensing nodes may be disposed to be spaced apart from each other by a predetermined distance and configured to be distributed corresponding to an area of a first surface of the first battery cell.

The pressure sensor may include an insulating film integrally covering the plurality of pressure sensing nodes; and a connector pin for transmitting a pressure signal generated by the plurality of pressure sensing nodes to an external device.

The insulating film may include a body portion having a size corresponding to a surface of the first battery cell and inserted between the first battery cell and the second battery cell; and a branch portion provided to extend to an outside of the cell stack from at least one side of the body portion, and the connector pin may be provided at an end of the branch portion.

According to another aspect of the present disclosure, there may be provided a battery pack including the battery module described above.

According to still another aspect of the present disclosure, there may be provided a vehicle including the battery module described above.

The sensitivity adjusting plate may have a plurality of recesses, and the plurality of pressure sensing nodes may fit into a respective one of the plurality of recesses.

Advantageous Effects

According to the present disclosure, during swelling of the battery cell, it is possible to detect any abnormality such as thermal propagation or the like of the battery cell by sensing the surface pressure of the battery cell above a certain level.

In addition, according to the present disclosure, it is possible to prevent the surface of the battery cell from being damaged by the pressure sensing nodes during swelling of the battery cell.

However, advantageous effects to be obtained by the present disclosure are not limited to the above-described effects, and other effects not mentioned herein may be clearly understood by those skilled in the art from the following description of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the present disclosure, so it should be understood that other equivalents and modifications could be made thereto without departing from the scope of the present disclosure.

Figure 1:
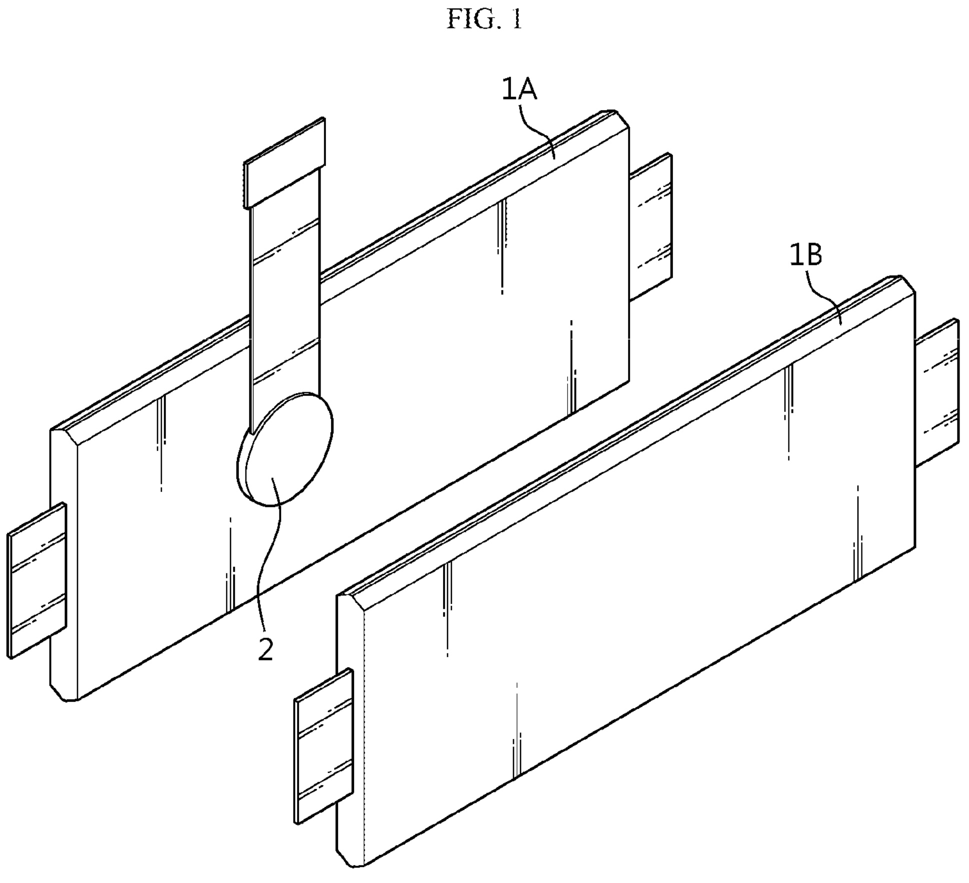
FIG. 1 is a view showing a pressure sensor of a battery module according to the prior art.
Figure 2:
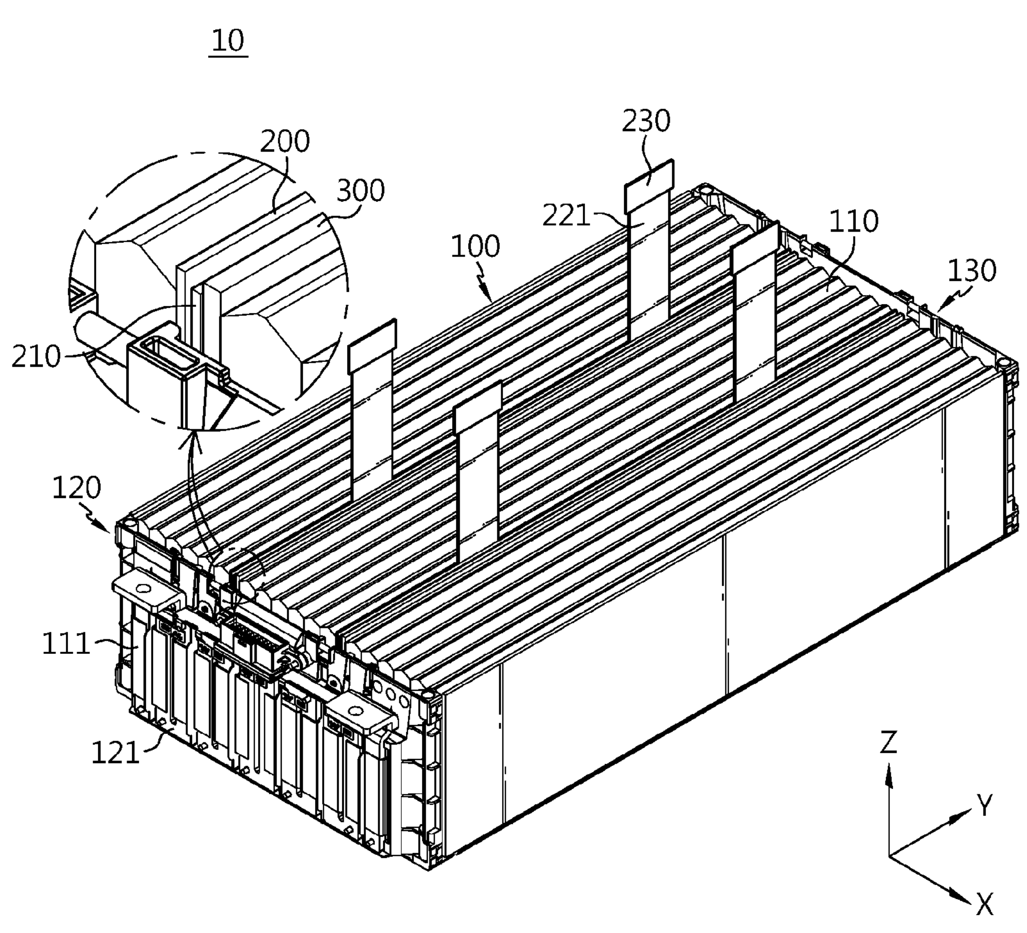
FIG. 2 is a schematic perspective view of a battery module according to an embodiment of the present disclosure.
Figure 3:
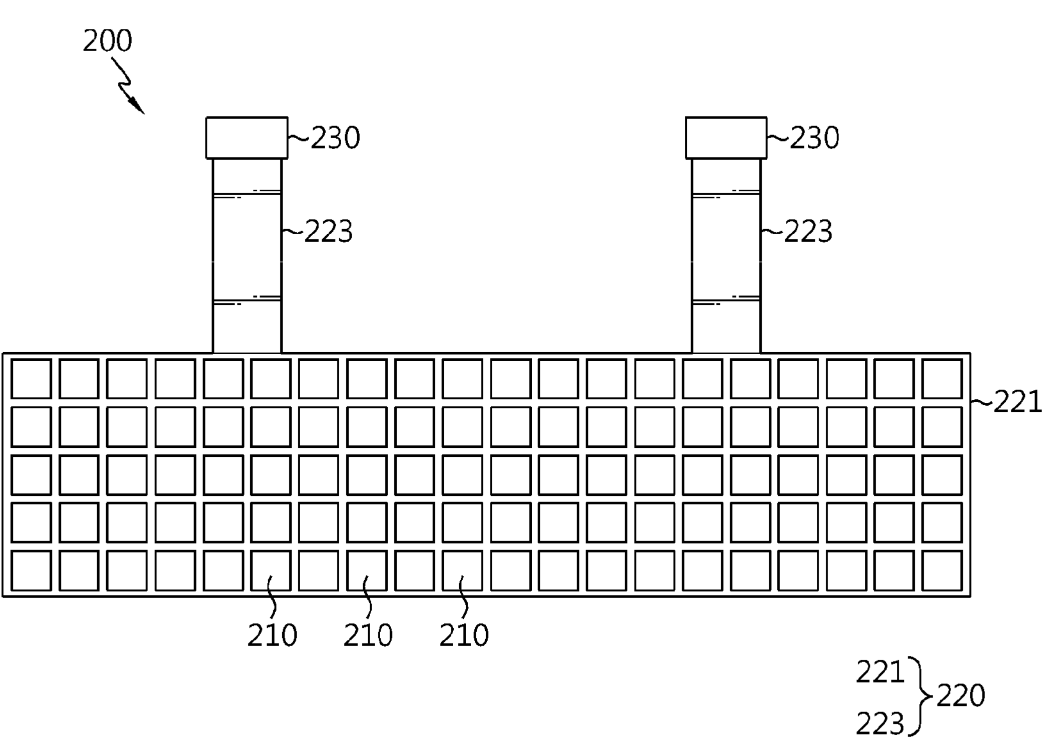
FIG. 3 is a plan view of a pressure sensor unit according to an embodiment of the present disclosure.

FIG. 2 is a schematic perspective view of a battery module according to an embodiment of the present disclosure, and FIG. 3 is a plan view of a pressure sensor unit according to an embodiment of the present disclosure.

Referring to these drawings, the battery module 10 according to an embodiment of the present disclosure includes a cell stack 100 having a plurality of battery cells 110 stacked in one direction; a pressure sensor unit 200 disposed between one battery cell 110 and another battery cell 110 facing the battery cell, and having a plurality of pressure sensing nodes 210 protruding toward the other battery cell 110; and a surface pressure transmission plate 300 disposed between the pressure sensor unit 200 and the other battery cell 110, and having a flat surface facing the plurality of pressure sensing nodes 210.

The cell stack 100 may be referred to as an assembly of battery cells 110 formed by stacking a plurality of battery cells 110. The cell stack 100 of the present embodiment is formed by standing the battery cells 110 in a vertical direction and stacking them in a horizontal direction. Here, the battery cell 110 is a pouch-type battery cell 110, and may be stacked with wide surfaces facing each other.

The pouch-type battery cell 110 includes a pouch exterior material, an electrode assembly and an electrolyte provided to be accommodated in the pouch exterior material. For example, the pouch-type exterior material may be composed of two pouches, and a concave inner space may be formed in at least one of them. And, the electrode assembly may be accommodated in the inner space of the pouch. The circumferences of the two pouches are fused to each other, so that the inner space in which the electrode assembly is accommodated may be sealed. An electrode lead 111 may be attached to the electrode assembly, and the electrode lead 111 may be exposed to the outside of the pouch exterior material by being interposed between the fused portions of the pouch exterior material, thereby functioning as an electrode terminal of the battery cell 110. As an alternative to the pouch-type battery cell 110, a prismatic battery cell 110 in which an exterior material is formed of a metal in a substantially rectangular parallelepiped shape may be used.

The pouch-type battery cells 110 may be electrically connected to each other by a bus bar assembly. As shown in FIG. 2, the bus bar assembly is a component assembled to the front and rear of the cell stack 100 and includes bus bar frames 120, 130 and a plurality of bus bars 121.

The bus bar frames 120, 130 may be provided in the form of a plate body having a size that may cover the front or rear of the cell stack 100, and may have slots (not shown) through which the electrode leads 111 may pass. The slots may be provided along the same direction as the stacking direction of the battery cells 110. In addition, the bus bar frames 120, 130 may be configured to attach a plurality of bus bars 121 to outer surfaces thereof.

The plurality of bus bars 121 may be made of a metal material such as copper, aluminum, or the like having electrical conductivity, and may be provided along the same direction as the stacking direction of the battery cells 110 on the outer surfaces of the bus bar frames 120, 130 as shown in FIG. 2.

For example, the positive electrode leads of the Nth to (N+3)th pouch-type battery cells 110 are stacked and inserted into any one slot to be drawn out from the inside of the bus bar frame 120 to the outside, and the drawn out portion is bent to be welded to the surface of any one bus bar 121. Then, the negative electrode leads of the (N+4)th to (N+6)th pouch-type battery cells 110 are stacked and inserted into another slot to be drawn out from the inside of the bus bar frame 120 to the outside, and the drawn out portion is bent to be welded to the surface of the bus bar in which the positive electrode leads of the Nth to (N+3)th pouch-type battery cells 110 are welded. In this manner, the pouch-type battery cells 110 may be connected in series and in parallel by welding the electrode leads 111 of the pouch-type battery cells 110 to the corresponding bus bars 121.

The pressure sensor unit 200 is a component inserted to be disposed between two battery cells 110 facing each other among the pouch-type battery cells 110, and is for measuring pressure when the battery cells 110 are swelling during operation of the battery module. The pressure sensor unit 200 is in the form of a film type, and may be configured to include a plurality of pressure sensing nodes 210, an insulating film 220 integrally covering the plurality of pressure sensing nodes 210, and a connector pin 230 for transmitting a pressure signal to an external device.

Each pressure sensing node 210 may be configured as a force sensitive resistor (FSR) sensor using a property in which a resistance value is changed according to physical force, weight, and the like. When pressure is applied to each of the pressure sensing nodes 210, the changed resistance value may be converted into a digital value to know the strength of the pressure. The pressure sensor unit 200 of the present embodiment is configured such that the pressure sensing nodes 210 are disposed to be spaced apart from each other at a predetermined interval and distributed to correspond to an area range of one surface of the pouch-type battery cell 110.

According to this configuration, it is possible to determine the pressure distribution for each relative region in which portion of the pouch-type battery cell 110 has a large expansion force during swelling. In addition, the overall surface pressure may be determined by synthesizing each data of the pressure sensing nodes 210, and it is possible to detect any abnormal state such as thermal propagation by checking whether the overall surface pressure of the battery cell identified in this way is equal to or greater than a specific value. Here, the specific value may mean a standard pressure value derived in advance through an experiment as an overall surface pressure value of the battery cell 110 when an abnormal state such as thermal propagation occurs.

The insulating film 220 may be a film formed of a material having heat resistance, insulation, excellent mechanical strength, and flexibility, such as polyimide, and may include a body portion 221 and a branch portion 223.

As shown in FIGS. 2 and 3, the body portion 221 is provided in a size corresponding to one surface of the battery cell 110 and inserted into the cell stack 100. All of the pressure sensing nodes 210 may be provided in the body portion 221 to receive force from the battery cell 110 during swelling.

The branch portion 223 is a portion provided to extend to the outside of the cell stack 100 from at least one side of the body portion 221. Although not shown in detail, the branch portion 223 includes conductor lines (not shown) connected to each pressure sensing node 210. One or more branch portions 223 may be provided according to the number of pressure sensing nodes 210, and the pressure sensor unit of the present embodiment includes two branch portions 223.

The connector pin 230 is a terminal of the pressure sensor unit 200 for transmitting the pressure signal detected by the pressure sensing nodes 210 to an external device, and may be configured to be coupled to one end of the branch portion 223 or may be integrally formed with the branch portion 223.

Figure 4:
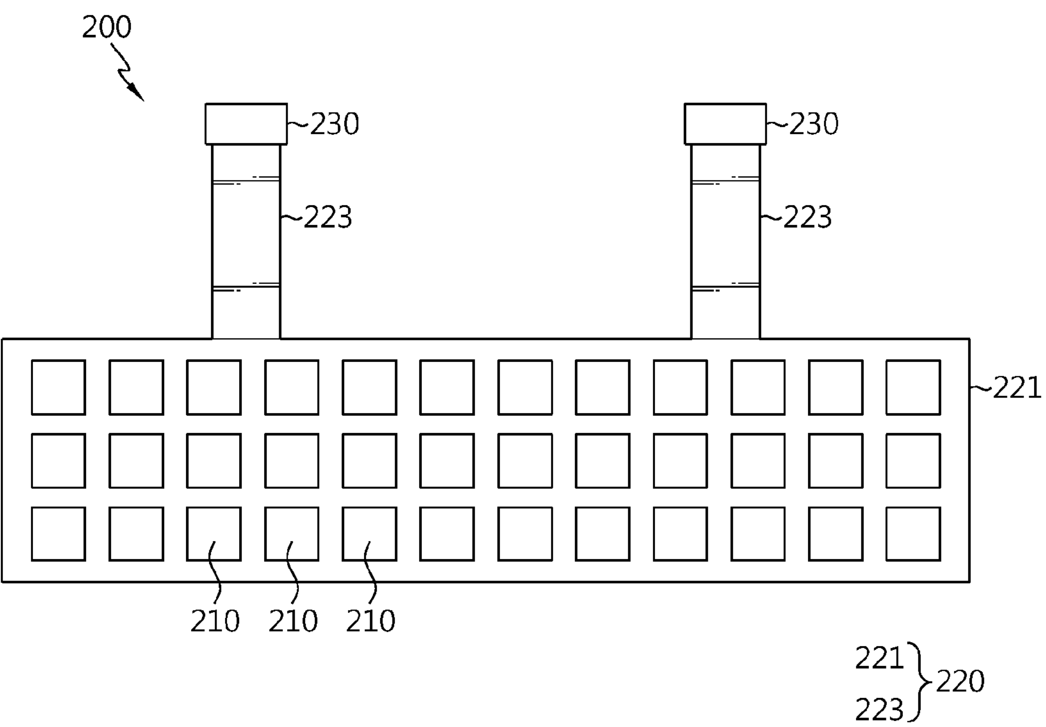
FIG. 4 is a view showing a modified example of the pressure sensor unit of FIG. 3.

FIG. 4 is a view showing a modified example of the pressure sensor unit of FIG. 3.

Meanwhile, the size and number of the pressure sensing node 210 may be configured differently from the pressure sensing node 210 of FIG. 3. For example, as shown in FIG. 4, the pressure sensor unit 200 according to the modified example may have pressure sensing nodes 210 larger than and fewer than the pressure sensing node 210 of FIG. 3. In this case, the performance of measuring the relative distribution of pressure during swelling is lowered. However, the configuration of the pressure sensing node 210 as shown in FIG. 4 may be sufficient for determining whether the overall surface pressure of the battery cell 110 is equal to or greater than a predetermined pressure value rather than the pressure distribution of the battery cell 110. That is, the pressure sensor unit 200 may vary the number and size of the pressure sensing nodes 210 according to the purpose of use.

Figure 5:
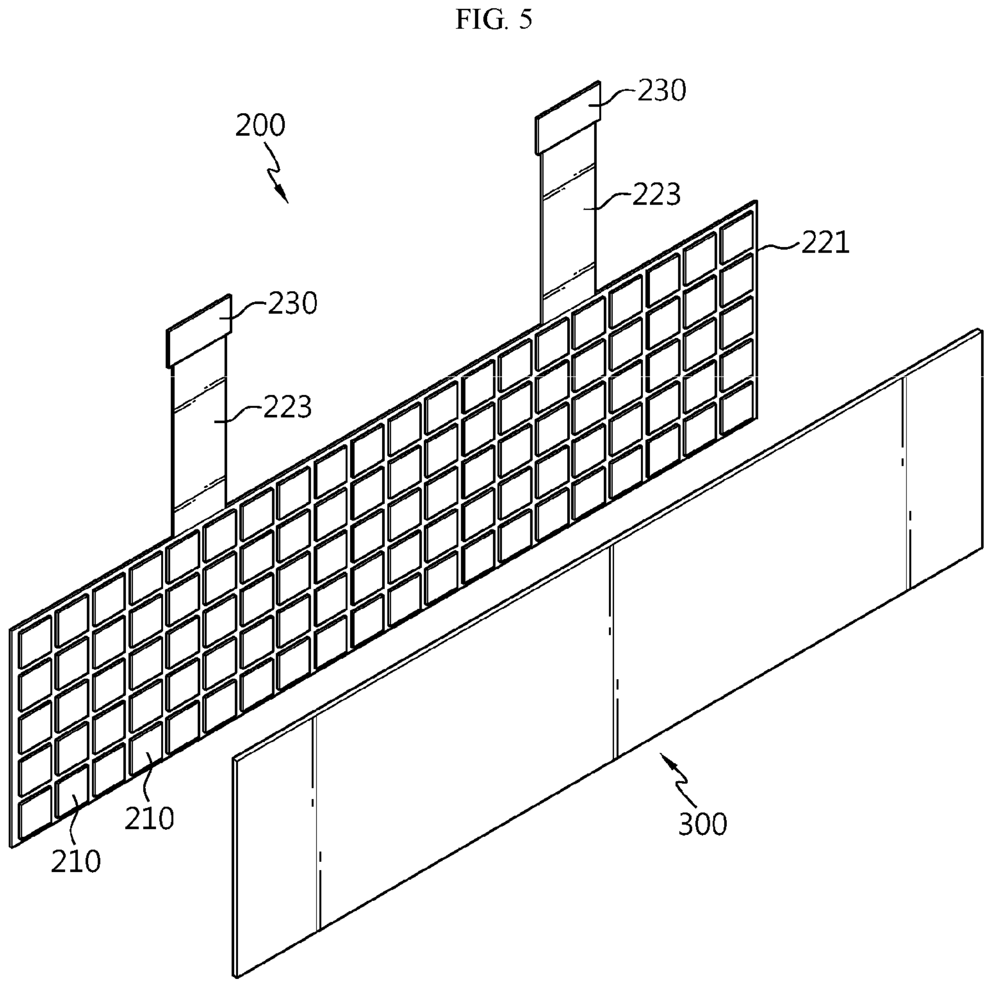
FIG. 5 is a perspective view showing a pressure sensor unit and a surface pressure transmission plate among components of a battery module according to an embodiment of the present disclosure.
Figure 6:
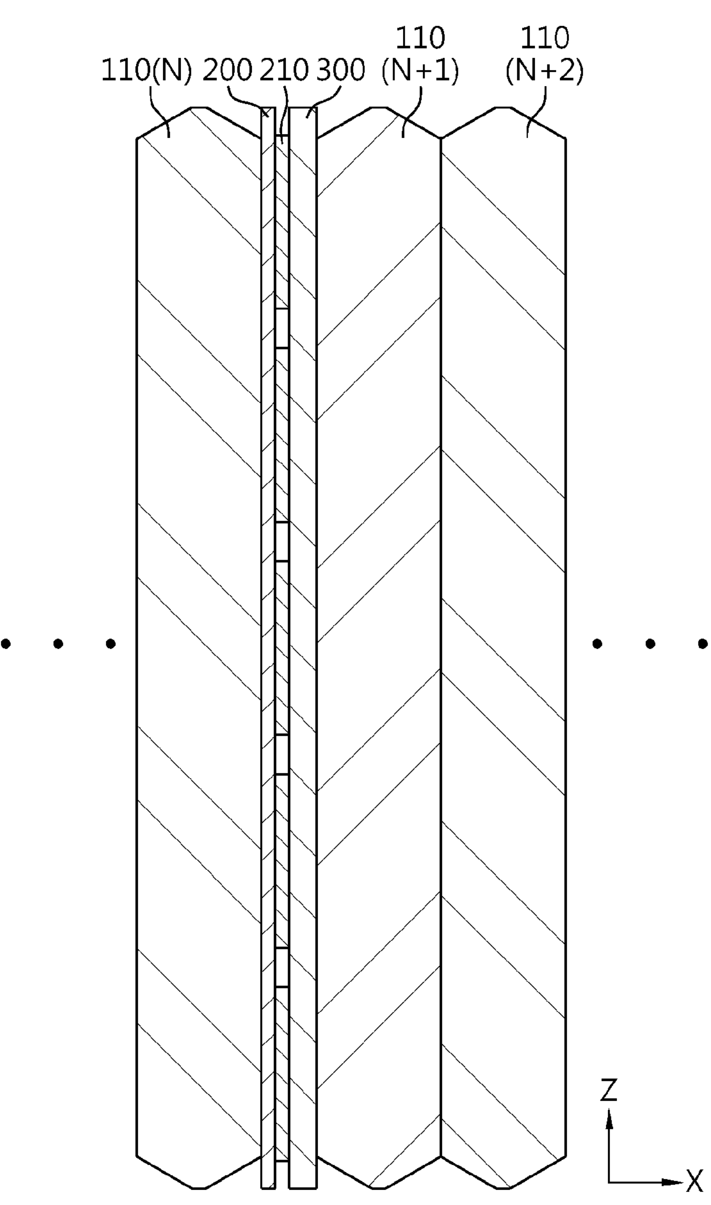
FIG. 6 is a partial cross-sectional view of a battery module according to an embodiment of the present disclosure.

FIG. 5 is a perspective view showing a pressure sensor unit and a surface pressure transmission plate among components of a battery module according to an embodiment of the present disclosure, and FIG. 6 is a partial cross-sectional view of a battery module according to an embodiment of the present disclosure.

As a main component of the battery module 10 of the present disclosure, the surface pressure transmission plate 300 may be provided in the form of a plate body in which one surface faces the body portion 221 of the pressure sensor unit and the other surface faces one surface of the battery cell 110(N+1).

The surface pressure transmission plate 300 of the present embodiment may be made of lightweight plastic having strength and thickness sufficient to prevent marks from being formed even if concentrated pressure is applied by locally contacting the protruding pressure sensing nodes 210. In addition, the surface pressure transmission plate 300 may be provided to have a size corresponding to the area of one surface of the battery cell 110 so that the expansion force of the battery cell 110 is evenly transmitted to each pressure sensing node 210 when the battery cell 110 swells.

More specifically, as shown in FIG. 6, the pressure sensor unit 200 and the surface pressure transmission plate 300 may be disposed between the Nth battery cell 110(N) and the (N+1)th battery cell 110(N+1) among the cell stack 100 in which the battery cells 110(N), 110(N+1), 110(N+2) . . . are stacked in one direction. At this time, the side where the pressure sensing nodes 210 protrude from the pressure sensor unit 200 should be configured to face the surface pressure transmission plate 300.

Assuming that the swelling phenomenon occurs in the battery cells 110, the force of the battery cells 110 is applied to the pressure sensor unit and the surface pressure transmission plate 300, thereby changing the resistance value of the pressure sensing nodes 210, and this value is output as a digital value. At this time, the surface pressure transmission plate 300 receives the expansion force of the (N+1)th battery cell 110 and evenly transmits it to each pressure sensing node 210. In addition, the surface pressure transmission plate 300 serves to protect the surface of the (N+1)th battery cell 110(N+1) from the protruding pressure sensing nodes 210. Assuming that there is no surface pressure transmission plate 300 in FIG. 6, when the battery cells 110 are swelling, the surface of the (N+1)th battery cell 110(N+1) is repeatedly locally pressed by each protruding pressure sensing node 210. Accordingly, the battery cell 110 may be damaged, resulting in problems in performance or life characteristics.

However, in the battery module 10 of the present disclosure, as shown in FIG. 6, the surface pressure transmission plate 300 is configured to receive local pressure by each pressure sensing node 210 in place of the (N+1)th battery cell 110(N+1). Therefore, according to the surface pressure transmission plate 300, the problem of abnormal behavior of the battery cell 110, which may be caused by local pressure on the surface of the battery cell 110 by each protruding pressure sensing node during swelling, may be solved. In addition, the surface pressure transmission plate 300 receives the expansion force of the battery cell 110 and evenly transmits it to each pressure sensing node 210, thereby facilitating measurement of the overall surface pressure of the battery cell 110.

According to the configuration of the present disclosure as described above, it is possible to monitor pressure changes of the battery cells 110 during operation of the battery module 10. Through such monitoring, when a situation in which the overall surface pressure of the battery cell 110 exceeds a specific value occurs, the operation of the battery module 10 is immediately stopped and safety measures are taken to enable to prevent fire or explosion of the battery module 10.

In addition, the battery module 10 of the present disclosure includes the surface pressure transmission plate 300, which may protect the surface of the battery cell 110 from the reaction of the pressure sensing nodes 210 caused by repeated swelling.

Figure 7:
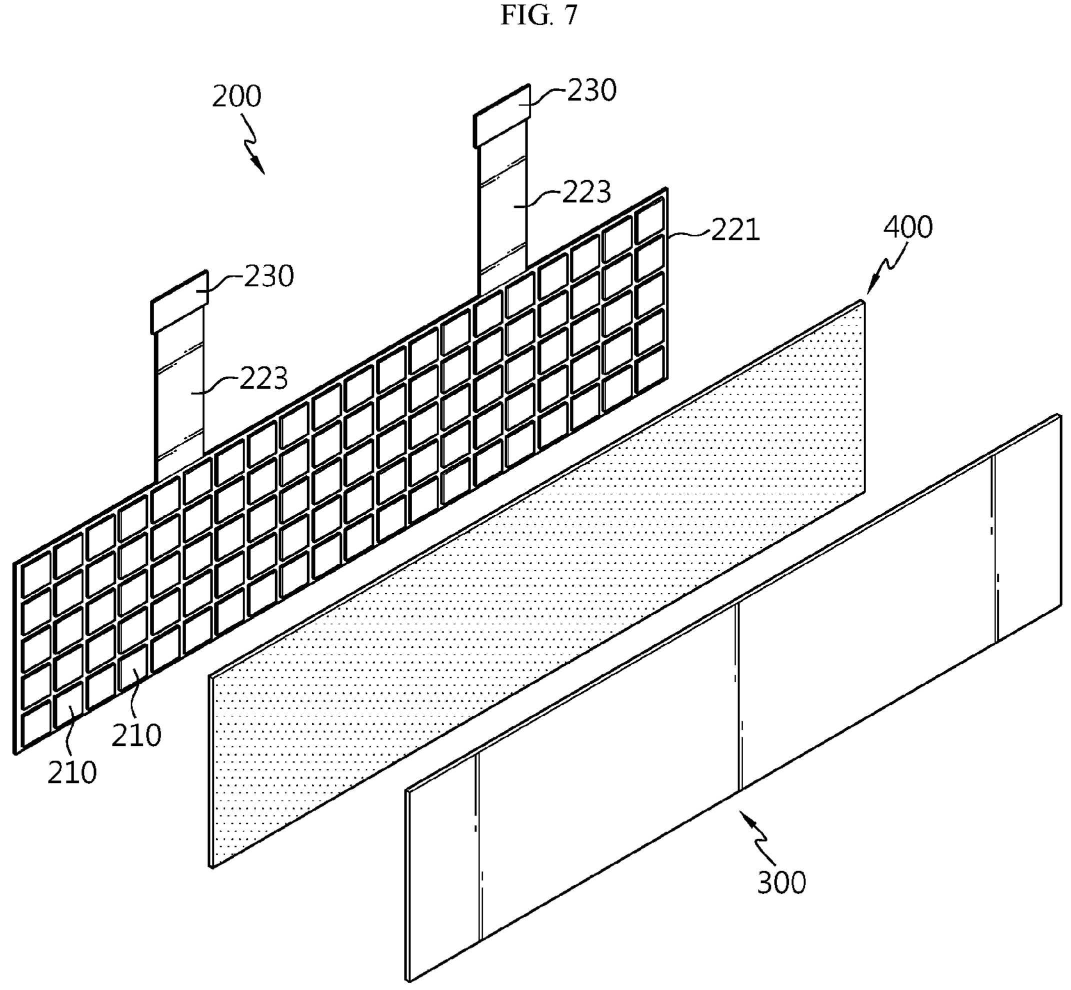
FIG. 7 is a perspective view showing a pressure sensor unit, a sensitivity adjusting member, and a surface pressure transmission plate as main components of a battery module according to another embodiment of the present disclosure.
Figure 8:
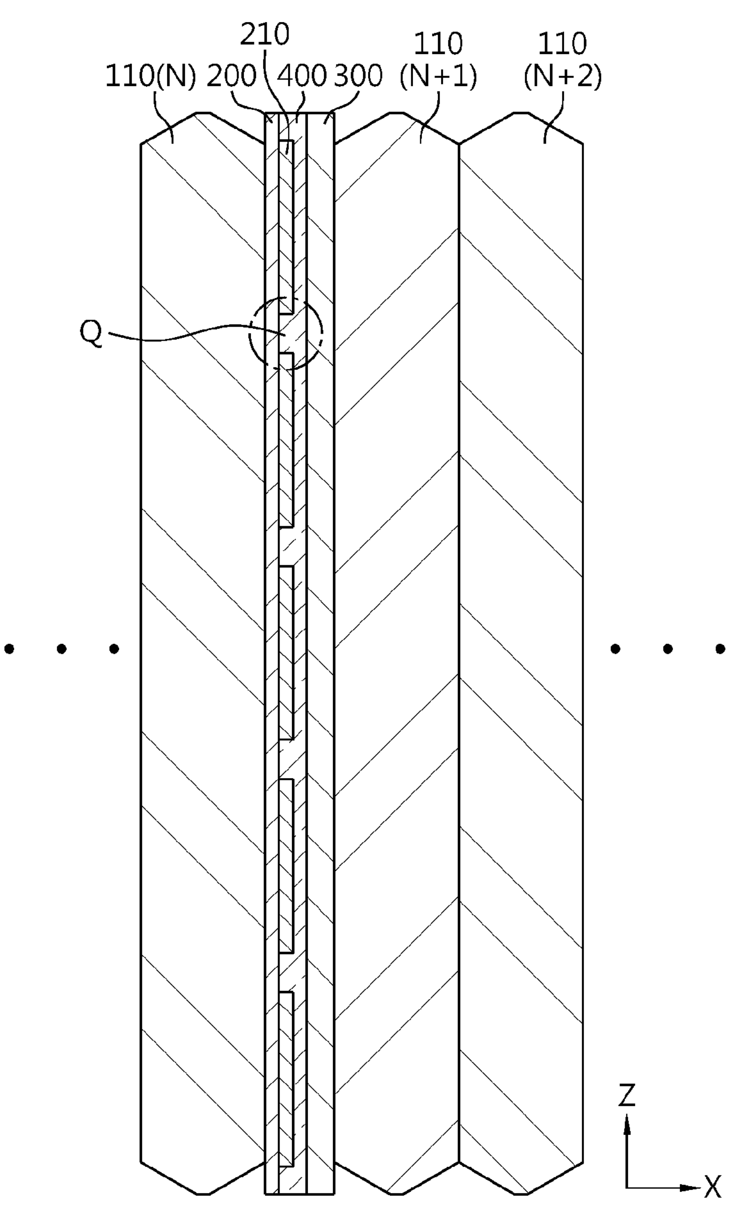
FIG. 8 is a partial cross-sectional view of a battery module according to another embodiment of the present disclosure.

FIG. 7 is a perspective view showing a pressure sensor unit, a sensitivity adjusting member, and a surface pressure transmission plate as main components of a battery module according to another embodiment of the present disclosure, and FIG. 8 is a partial cross-sectional view of a battery module according to another embodiment of the present disclosure.

Next, another embodiment of the present disclosure will be described with reference to FIGS. 7 and 8. The same reference numbers as those in the above-described embodiment represent the same members, and the repeated description of the same members will be omitted, but differences from the above-described embodiment will be mainly described.

When compared with the battery module 10 according to the above-described embodiment, the battery module 10 according to another embodiment of the present disclosure further includes a sensitivity adjusting member 400.

The sensitivity adjusting member 400 is formed of a compressible material and is disposed between the plurality of pressure sensing nodes 210 and the surface pressure transmission plate 300.

The sensitivity adjusting member 400 serves to maintain a gap between the surface pressure transmission plate 300 and the pressure sensing node 210, so that the pressure sensing node 210 operates insensitively at a specific force or less.

As described above, a slight swelling phenomenon may be repeated even during normal charge/discharge of the battery cell 110. The sensitivity adjusting member 400 maintains a gap between the surface pressure transmission plate 300 and the pressure sensing node 210 so that the pressure sensing node 210 does not react to this slight swelling phenomenon, resulting in making the sensor insensitive. In addition, the sensitivity adjusting member 400 serves to block heat generated from the battery cell 110. The pressure sensing node 210 may react sensitively at a high temperature, and heat from the battery cell 110 should be blocked so that the pressure sensing node 210 does not react due to heat.

The sensitivity adjusting member 400 may be provided in the form of, for example, a form pad. In the foam pad as shown in FIG. 8, a surface facing the surface pressure transmission plate 300 may be flat, and a surface facing the pressure sensor unit may have a concave-convex structure filling a gap Q due to steps between pressure sensing nodes 210. In addition, the foam pad may be configured not to be compressed under a predetermined pressure by selectively using various materials having different compression rates or strain rates and adjusting the thickness. That is, the foam pad may be configured to cover each pressure sensing node 210 between the Nth battery cell 110(N) and the surface pressure transmission plate 300 in FIG. 8, thereby serving to protect each pressure sensing node 210 from external force and heat.

Therefore, compared to the above-described embodiment, the battery module 10 according to another embodiment of the present disclosure allows the pressure sensing nodes 210 to react when a strong pressure of a certain level or more is applied, but the reaction of the pressure sensing nodes is made insensitive to slight swelling of the battery cells 110 that is generally repeated during charge/discharge, and thus during operation of the battery module 10, a general swelling situation of the battery cell 110 and a swelling situation in the event of an abnormality, such as thermal propagation of the battery cell 110, may be clearly distinguished and detected. In addition, since the sensitivity adjusting member 400 in the form of a foam pad surrounds each pressure sensing node 210 in the battery module 10 according to another embodiment of the present disclosure, it is more effective in resolving concerns about surface damage of the battery cell 110 caused by protrusion of the pressure sensing node 210 than in the case of the above-described embodiment.

Meanwhile, a battery pack (not shown) according to the present disclosure includes at least one battery module. In addition, the battery pack may be configured to further include various devices (not shown) for controlling charge/discharge of the battery module, for example, a battery management system (BMS), a current sensor, a fuse, and the like.

The battery pack according to the present disclosure may be applied to a vehicle such as an electric vehicle or a hybrid vehicle. That is, the vehicle according to the present disclosure may include the battery pack according to the present disclosure. The battery pack may be installed in a body frame under a vehicle seat or in a trunk space.

Meanwhile, the terms indicating directions as used herein such as up, down, left, right, front, and back are used for convenience of description only, and it is obvious to those skilled in the art that the terms may change depending on the position of the stated element or an observer.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the equivalent scope of the appended claims.

What is claimed is:

1. A battery module comprising:

a cell stack having a plurality of battery cells stacked in a first direction;

a pressure sensor disposed between a first battery cell of the plurality of battery cells and a second battery cell of the plurality of battery cells facing the first battery cell, and having a plurality of pressure sensing nodes protruding toward the second battery cell;

a surface pressure transmission plate disposed between the pressure sensor and the second battery cell, and having a flat surface facing the plurality of pressure sensing nodes; and a sensitivity adjusting plate formed of a compressible material and disposed between the plurality of pressure sensing nodes and the surface pressure transmission plate, wherein the sensitivity adjusting plate has a plurality of recesses, wherein the plurality of pressure sensing nodes fit into a respective one of the plurality of recesses, and wherein the surface pressure transmission plate has a solid interior.

2. The battery module according to claim 1, wherein the surface pressure transmission plate has a size corresponding to an area of a surface of the first battery cell.

3. The battery module according to claim 1, wherein the surface pressure transmission plate is made of a plastic material.

4. The battery module according to claim 1, wherein the sensitivity adjusting plate is a foam pad.

5. The battery module according to claim 1, wherein the sensitivity adjusting plate is configured not to be compressed at less than a predetermined pressure.

6. The battery module according to claim 1, wherein the plurality of battery cells are pouch-type battery cells.

7. The battery module according to claim 6, wherein the plurality of pressure sensing nodes are disposed to be spaced apart from each other by a predetermined distance and configured to be distributed corresponding to an area of a first surface of the first battery cell.

8. The battery module according to claim 1, wherein the pressure sensor further comprises:

an insulating film integrally covering the plurality of pressure sensing nodes; and a connector pin for transmitting a pressure signal generated by the plurality of pressure sensing nodes to an external device.

9. The battery module according to claim 8, wherein the insulating film comprises:

a body portion having a size corresponding to a surface of the first battery cell and inserted between the first battery cell and the second battery cell; and a branch portion provided to extend to an outside of the cell stack from at least one side of the body portion, and wherein the connector pin is provided at an end of the branch portion.

10. A battery pack comprising the battery module according to claim 1.

11. A vehicle comprising the battery pack according to claim 10.

* * * * *